(12) United States Patent
Vozar et al.

(10) Patent No.: US 10,614,709 B2
(45) Date of Patent: Apr. 7, 2020

(54) SYSTEMS AND METHODS FOR IMPLEMENTING MULTIMODAL SAFETY OPERATIONS WITH AN AUTONOMOUS AGENT

(71) Applicant: May Mobility, Inc., Ann Arbor, MI (US)

(72) Inventors: Steve Vozar, Ann Arbor, MI (US); Edwin Olson, Ann Arbor, MI (US); Sean M. Messenger, Ann Arbor, MI (US); Collin Johnson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 16/505,372

(22) Filed: Jul. 8, 2019

(65) Prior Publication Data

US 2020/0035098 A1    Jan. 30, 2020

Related U.S. Application Data

(60) Provisional application No. 62/702,715, filed on Jul. 24, 2018.

(51) Int. Cl.
*G08G 1/0967* (2006.01)
*G08G 1/01* (2006.01)
*G05D 1/00* (2006.01)

(52) U.S. Cl.
CPC ..... *G08G 1/096725* (2013.01); *G05D 1/0088* (2013.01); *G08G 1/0116* (2013.01); *G05D 2201/0213* (2013.01)

(58) Field of Classification Search
CPC ........... G08G 1/096725; G08G 1/0116; G05D 1/0088; G05D 2201/0213
USPC .......................................................... 701/24
See application file for complete search history.

(56) References Cited

U.S. PATENT DOCUMENTS

| 2019/0066399 A1* | 2/2019 | Jiang | G05D 1/0088 |
| 2019/0106117 A1* | 4/2019 | Goldberg | B60W 50/04 |
| 2019/0236950 A1* | 8/2019 | Li | G05D 1/0088 |

* cited by examiner

*Primary Examiner* — Paula L Schneider
(74) *Attorney, Agent, or Firm* — Jeffrey Schox; Caitlin Ploch

(57) ABSTRACT

A system and method includes an autonomous agent having a communication interface that enables the autonomous agent to communicate with a plurality of infrastructure sensing devices; a plurality of distinct health monitors that monitor distinct operational aspects of the autonomous agent; an autonomous state machine that computes a plurality of allowed operating states of the autonomous agent based on inputs from the plurality of distinct health monitors; a plurality of distinct autonomous controllers that generate a plurality of distinct autonomous control instructions; and an arbiter of autonomous control instructions that: collects, as a first input, the plurality of autonomous control instructions generated by each of the plurality of distinct autonomous controllers; collects, as a second input, data relating to the plurality of allowed operating state of the autonomous agent; and selectively enables only a subset of the autonomous control instructions to pass to driving components of the autonomous agent.

19 Claims, 5 Drawing Sheets

SYSTEMS AND METHODS FOR IMPLEMENTING MULTIMODAL SAFETY OPERATIONS WITH AN AUTONOMOUS AGENT

CROSS-REFERENCE TO RELATED APPLICATIONS

This application claims the benefit of U.S. Provisional Application No. 62/702,715, filed 24 Jul. 2018, which is incorporated in its entirety by this reference.

TECHNICAL FIELD

The inventions relate generally to the vehicle automation field, and more specifically to new and useful systems and methods for intelligently operating an autonomous agent according to an arbitrated safe operating mode in the vehicle automation field.

BACKGROUND

State of the art vehicle automation presently enables some autonomous vehicles to operate in a substantially and/or fully autonomous state. An ability of such autonomous vehicles to operate effectively and safely in busy or active environments often relies on an ability of the autonomous agent to observe its operating environment and make operating decisions that enables the autonomous agent to achieve a routing or traveling goal in a safe manner.

To achieve safe autonomous operation, autonomous vehicles may be configured with many sensors, sources of compute, sources of power and actuators that operate together to enable the autonomous vehicle to perceive and comprehend its environment and further, compute decisions and controls that optimizes how safely that the autonomous vehicle traverses the environment.

However, many state of the art vehicle automation systems or practices may be designed to enable a relatively safe operation of an autonomous vehicle based on an assumption that all devices, components, and/or processes for operating the autonomous vehicle are not in a non-nominal or a diminished state.

Thus, there is a need in the vehicle automation field for systems and method for operating an autonomous vehicle safely when one or more devices, processes, and the like associated with the autonomous vehicle may be failed or have failed to some degree. The embodiments of the present application described herein provide technical solutions that address, at least, the need described above.

BRIEF SUMMARY OF THE INVENTION(S)

Figure 1:
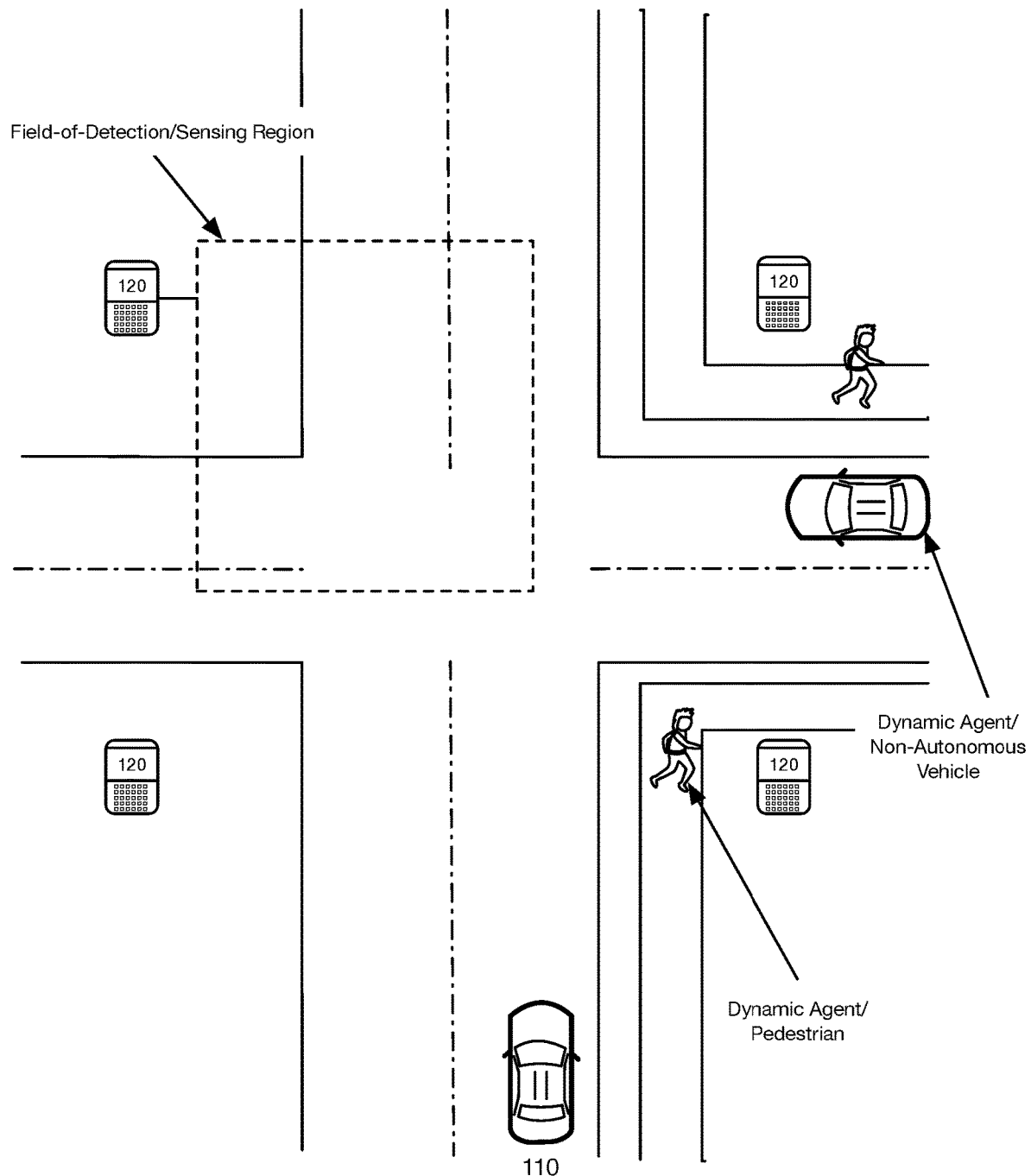
FIG. 1 illustrates a schematic representation of a system for implementing an autonomous agent in accordance with one or more embodiments of the present application.

In one embodiment, a system for intelligently implementing an autonomous agent includes a plurality of infrastructure sensing devices; an autonomous agent comprising: a communication interface that enables the autonomous agent to communicate with at least one of the plurality of infrastructure sensing devices; a plurality of distinct health monitors, wherein each of the plurality of distinct autonomous health monitors distinct operational aspect of the autonomous agent; an autonomous state machine that computes an operating state of the autonomous agent based on inputs from one or more of the plurality of distinct health monitors; a plurality of distinct autonomous controllers that generate a plurality of distinct autonomous control instructions; and an arbiter of autonomous control instructions that: collect, as a first input, the plurality of autonomous control instructions generated by each of the plurality of distinct autonomous controllers; collect, as a second input, data relating to the computed operating state of the autonomous agent; and selectively enables only a subset of the plurality of distinct autonomous control instructions to pass to one or more driving components of the autonomous agent thereby controlling operations of the one or more driving components.

In one embodiment, each of the plurality of infrastructure sensing devices generates subjective health status data based on introspective evaluations of one or more operations and/or one or more systems of the respective infrastructure sensing device of the plurality of infrastructure devices.

In one embodiment, the computed operating state of the autonomous agent includes a computed value that indicates an extent to which capabilities of the autonomous agent are operable or not operable.

In one embodiment, each of the plurality of distinct autonomous controllers: collects data streams of observation data from a plurality of distinct data sources; operates asynchronously to simulate one or more trajectory outcomes for the autonomous agent based on the observation data; and generates autonomous control instructions based on a simulation having a highest probability of occurring.

In one embodiment, the arbiter of autonomous control instructions switches between the plurality of distinct autonomous control instructions based on the computed operating state of the autonomous agent.

In one embodiment, the arbiter of autonomous control instructions blocks a portion of the plurality of distinct autonomous control instructions from passing to the one or more driving components of the autonomous agent based on the computed operating state of the autonomous agent.

In one embodiment, the arbiter of autonomous control instructions includes selection circuitry comprising a plurality of instruction filters, wherein based on the computed operating state of the autonomous agent, a subset of the plurality of instruction filters is selectively activated for filtering out portions of the plurality of autonomous control instructions.

In one embodiment, a method for intelligently implementing an autonomous agent includes collecting streams of data from one or more data sources associated with an autonomous agent; generating, by a plurality of health monitors, autonomous health intelligence data indicating a quality of operation of one or more operational aspects of the autonomous agent; identifying a level of operability of the autonomous agent based on the autonomous health intelligence data; computing by a plurality of autonomous control planning modules a plurality of distinct autonomous control instructions; and controlling the autonomous agent by selectively passing a subset of the plurality of distinct autonomous control instructions based on the identified level of operability.

In one embodiment, the one or more data sources include one or more onboard sensor sensors of the autonomous agent and one or more offboard infrastructure devices arranged in an environmental proximity of the autonomous agent.

In one embodiment, generating the health intelligence data includes evaluating the streams of data against autonomous operating health standards.

In one embodiment, generating the health intelligence data includes evaluating the streams of data against one or more failure modes, wherein the one or more failure modes identify circumstances in which it is likely that a data source associated with the autonomous agent is in a failing state.

In one embodiment, if attributes of the streams of data match attributes of any of the one or more failure modes, one or more of the plurality of health monitors outputs health intelligence data indicating that a data source is likely in a failing state.

In one embodiment, each of the plurality of health monitors is mapped to expected health values, wherein the expected health values specify criteria that the one or more data sources should satisfy for a given level of operability of the autonomous agent.

In one embodiment, the level of operability relates to one of a plurality of differentiated levels of autonomous operation identified within an autonomous operation gradient.

In one embodiment, the autonomous operation gradient includes a range of distinct levels of autonomous operation of an autonomous agent ranging from fully autonomous operation at one side of the autonomous operation gradient to limited or no autonomous operation at an opposite of the autonomous operation gradient.

In one embodiment, within the autonomous operation gradient, a plurality of diminished or degraded levels of autonomous operation of an autonomous agent may be arranged between a level of fully autonomous operation and a level of limited or no autonomous operation.

In one embodiment, each of the plurality of differentiated levels of autonomous operation is mapped to a predetermined set of minimum capabilities of an autonomous agent, wherein the predetermined set of minimum capabilities indicates the minimally required capabilities for maintaining an associated level of autonomous operation.

In one embodiment, identifying the level of operability of the autonomous agent includes: evaluating the autonomous health intelligence data against one or more of levels within the autonomous operation gradient; and identifying a highest level of autonomous operation within the autonomous operation gradient that is satisfied by the autonomous health intelligence data.

In one embodiment, each of the plurality of autonomous control planning modules is mapped to a distinct one of the plurality of differentiated levels of autonomous operation.

In one embodiment, controlling the autonomous agent includes deciding which of the plurality of distinct autonomous control instructions from each of the plurality of autonomous control planning modules to allow as command instructions for controlling driving components and/or driving processes of the autonomous agent based on the identified level of operability.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. Overview

As discussed in the background section, various operating systems and/or devices associated with an autonomous vehicle may fail; however, modern vehicle automation technology is technically limited in approaches for safely controlling an autonomous vehicle according to a degree or grade of failure of the various operating systems and/or devices.

As a technical solution, the one or more embodiments of the present application function to calculate various grades of device or process failures associated with an autonomous agent and further, calculate levels of operability (e.g., run-levels) of an autonomous agent. In a preferred embodiment, the level of operability may be used for selecting autonomous control instructions from a hierarchy or cascade of available autonomous control instructions that may be used to safely control an autonomous agent in circumstances in which one or more systems, devices, and/or operations associated with the autonomous agent are degraded or have failed.

2. System for Autonomous Decisioning Using Infrastructure Sensing Data

Figure 1A:
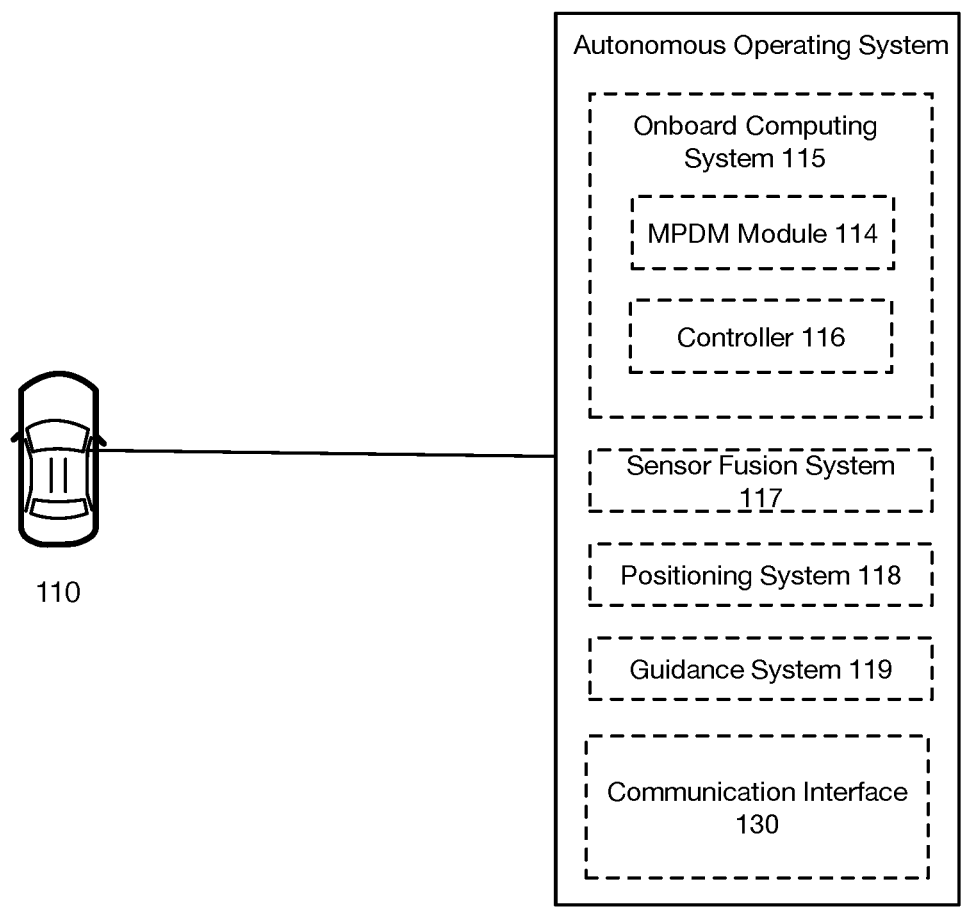
FIG. 1A illustrates an example schematic representation of an autonomous agent operating system in accordance with one or more embodiments of the present application.
Figure 3:
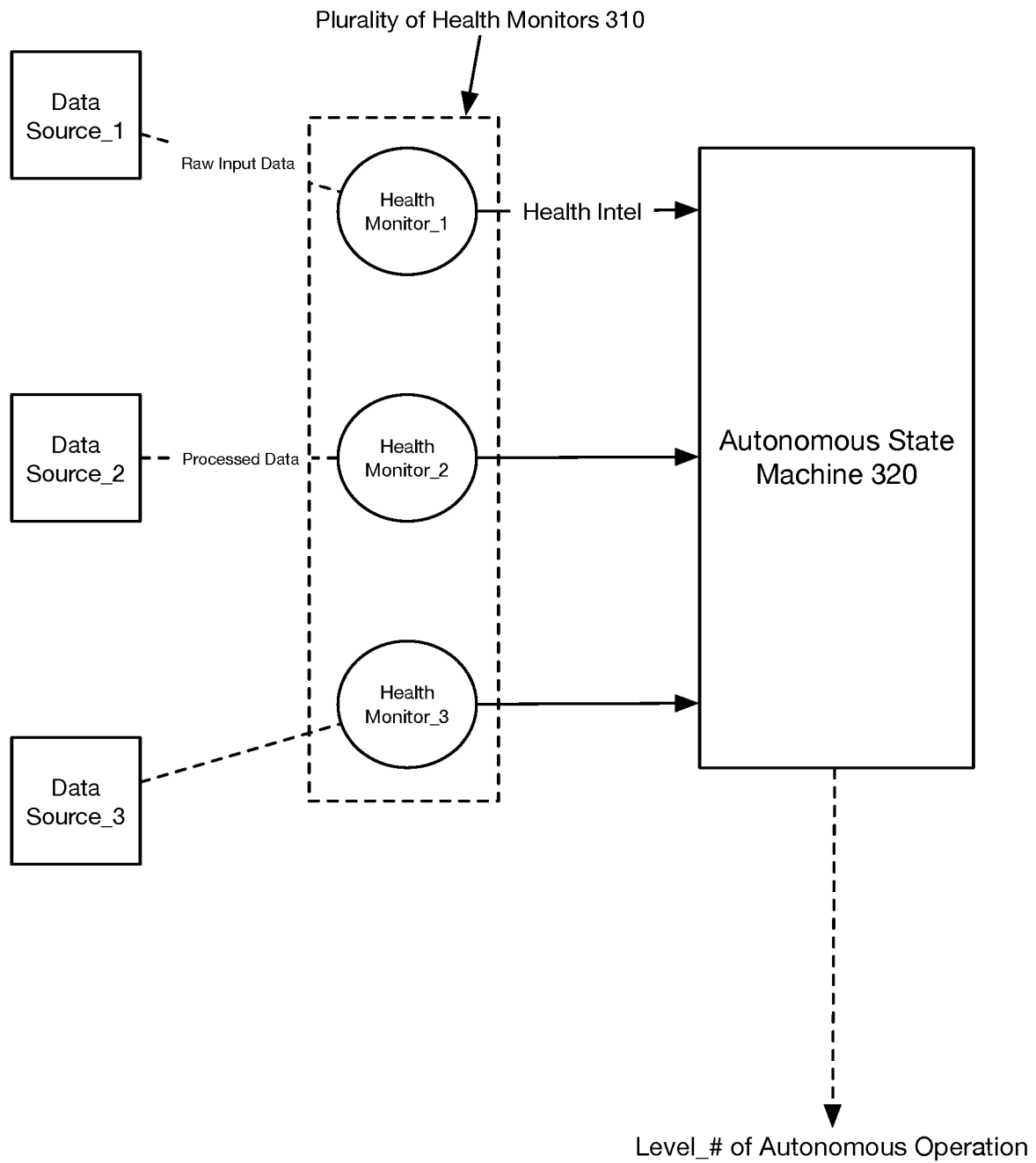
FIG. 3 illustrates an example schematic of a subsystem 300 of the system 100 for identifying a level of operability of an autonomous agent in accordance with one or more embodiments of the present application.
Figure 4:
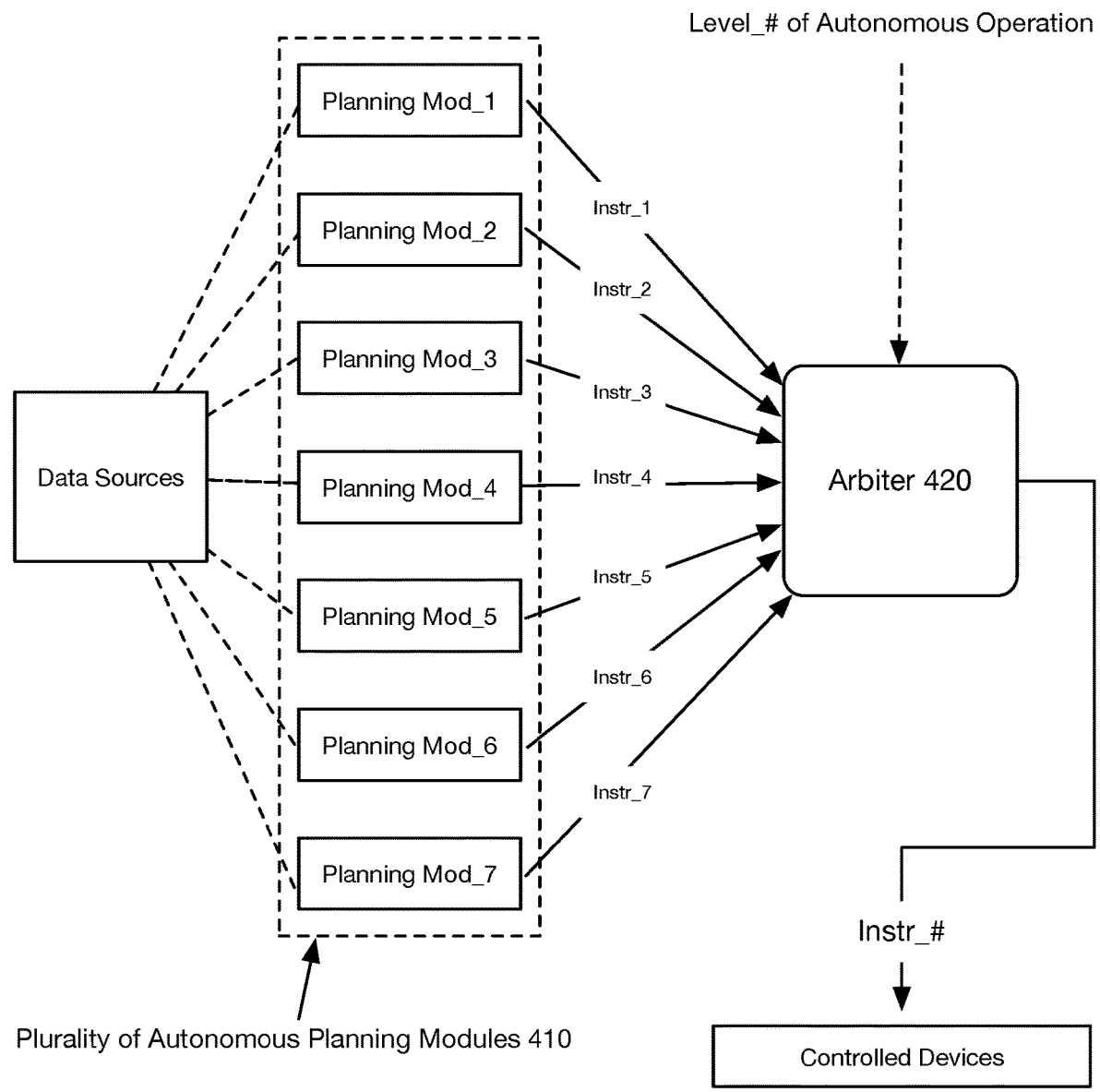
FIG. 4 illustrates an example schematic of a subsystem 400 of the system 100 for selectively transmitting autonomous control instructions for safely controlling an autonomous agent in accordance with one or more embodiments of the present application.

As shown in FIGS. 1-1A, a system 100 for intelligently implementing an autonomous agent that includes an autonomous agent 110, a plurality of infrastructure devices 120, and a communication interface 130. As shown in FIG. 3, a subsystem 300 of the system 100 includes a plurality of autonomous health monitors 310 and an autonomous state machine 320. Further, as shown in FIG. 4, a subsystem 400 of the system 100 includes a plurality of autonomous control planning modules (controllers) 410 and an arbiter of autonomous control instruction 420.

The autonomous agent 110 preferably includes an autonomous vehicle 110 that is preferably a fully autonomous vehicle, but may additionally or alternatively be any semi-autonomous or fully autonomous vehicle; e.g., a boat, an unmanned aerial vehicle, a driverless car, etc. Additionally, or alternatively, the autonomous agent 110 may be a vehicle that switches between a semi-autonomous state and a fully autonomous state (or a fully-manned state) and thus, the autonomous agent 110 may have attributes of both a semi-autonomous vehicle and a fully autonomous vehicle depending on the state of the autonomous agent 110. While some portions of the embodiments of the present application are described herein as being implemented via an autonomous agent 110 (e.g., an autonomous vehicle (e.g., a driverless car), a semi-autonomous, an unmanned aerial vehicle (e.g., a drone), or the like) it shall be noted that any suitable computing device (e.g., any edge device including mobile computing devices, etc.) may be implemented to process sensor data of an autonomous agent 110. While it is generally described that the autonomous agent 110 may be an autonomous vehicle, it shall be noted that the autonomous agent 110 may be any type of kind of autonomous machine, autonomous device, autonomous robot, and/or the like.

In a preferred embodiment, the autonomous agent 110 includes an onboard computing system 115 (e.g., a computer integrated with the autonomous agent) or any suitable vehicle system but can additionally or alternatively be decoupled from the autonomous agent 110 (e.g., a user mobile device operating independent of the autonomous agent).

Additionally, or alternatively, the onboard computing system 115 may include a processing system (e.g., graphical processing unit or GPU, central processing unit or CPU, or any suitable processing circuitry) as well as memory. The memory can be short term (e.g., volatile, non-volatile, random access memory or RAM, etc.) and/or long term (e.g., flash memory, hard disk, etc.) memory. As discussed below, the autonomous agent 110 may additionally include a communication interface 130 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). In a preferred embodiment, the onboard computing system 115 may operate to interact with and/or operably control any or one or more of the identified components or modules of the subsystem 300 and/or the subsystem 400.

Additionally, or alternatively, the autonomous agent 110 may be in operable communication with a remote or disparate computing system that may include a user device (e.g., a mobile phone, a laptop, etc.), a remote server, a cloud server, or any other suitable local and/or distributed computing system remote from the vehicle. The remote computing system is preferably connected to one or more systems of the autonomous agent through one or more data connections (e.g., channels), but can alternatively communicate with the vehicle system in any suitable manner.

The onboard computing system 115 preferably functions to control the autonomous agent 110 and process sensed data from a sensor suite (e.g., a computer vision system, LiDAR, flash LiDAR, wheel speed sensors, radar, GPS, etc.) of the autonomous agent 110 and/or other (infrastructure device 120) sensors to determine states of the autonomous agent 110 and/or states of agents in an operating environment of the autonomous agent 110. Based upon the states of the autonomous agent and/or agents in the operating environment and programmed instructions, the onboard computing system 115 preferably modifies or controls behavior of autonomous agent 110. Additionally, or alternatively, the onboard computing system 115 preferably includes a multi-policy decision-making module 114 that functions to generate behavioral policies and select a behavioral policy that the onboard computing system 115 may function to execute to control a behavior of the autonomous agent 110.

The onboard computing system 115 is preferably a general-purpose computer adapted for I/O communication with vehicle control systems and sensor systems but may additionally or alternatively be any suitable computing device.

Additionally, or alternatively, the onboard computing system 115 is preferably connected to the Internet via a wireless connection (e.g., via a cellular link or connection). Additionally, or alternatively, the onboard computing system 115 may be coupled to any number of wireless or wired communication systems.

The infrastructure devices 120 preferably function to observe one or more aspects and/or features of an environment and collect observation data relating to the one or more aspects and/or features of the environment. In such preferred embodiments, the infrastructure devices additionally function to collect data associated with the observations and transmit the collected data and/or processed derivatives of the collected data to the autonomous agent 110. In some implementations, the infrastructure devices may additional forward the collection observations data to an autonomous vehicle service and/or remote platform (e.g., implemented via a network of distributed computing systems or the like) that operates to interactively communicate and/or control one or more functions of the autonomous agent 110.

Additionally, or alternatively, each of the infrastructure devices 120 may function to generate an autogenous health status data based on continuous and/or periodic introspective evaluations of one or more operations, processes, operable features, and the like of the respective introspective device 120. The infrastructure devices 120 may function to transmit the health status data separately from and/or along with sensed data (observation data). In some embodiments, the infrastructure devices 120 may be referred to herein as roadside units. The roadside units preferably include devices in an immediate and/or close proximity or short-range communication proximity to an operating position of an autonomous agent 110, such as an autonomous car, and may function to collect data regarding circumstances surrounding the autonomous agent 110 and in areas proximate to a zone of operation of the autonomous agent 110. The zone of operation of the autonomous agent 110 may be defined as a predefined radius along a structured and/or unstructured route of the autonomous agent 110. For instance, in the case of a structured and/or predefined autonomous agent route, the proximate zone of operation of the autonomous agent may be one hundred feet (100 ft) along any point along the structured route. In such embodiments, the zone of operation may be defined as some radius or predefined distance (e.g., 100 ft) at any point along the structured route at which the autonomous agent 110 is positioned and/or operating (e.g., driving).

Additionally or alternatively, the roadside units may include one or more of offboard sensing devices including flash LiDAR, thermal imaging devices (thermal cameras), still or video capturing devices (e.g., image cameras and/or video cameras, etc.), global positioning systems, radar systems, microwave systems, inertial measuring units (IMUs), and/or the like.

The infrastructure devices 120 may additionally or alternatively include computing capabilities via processing circuitry and a communication interface that enables the infrastructure devices 120 to communicate with an autonomous agent 110.

A technical benefit achieved by the implementation of the infrastructure devices 120 includes an ability to observe circumstances (e.g., around corners, down perpendicular streets, etc.) beyond the observable scope of the autonomous agent 110. That is, at a given instance in time observations of one or more aspects of a given environment may be made by an autonomous agent 110 and observations of one or more different and/or overlapping aspects of the given environment may be made from a different perspective by one or more infrastructure devices 120 operating in the given environment. In such embodiments, the perspective of the infrastructure devices 120, including the observation data therefrom, may be augmented to observation data from the perspective of the autonomous agent 110 to generate a comprehensive perspective of the operating environment of the autonomous agent 110. In this way, improved predictions of the operating environment may be made and consequently, improved behavioral policy decisions may be selected and/or executed by the autonomous agent 110 for operating independently and safely within the operating environment.

As mentioned above, the autonomous agent 110 may function to augment data derived by its own onboard sensor suite with the additional observations by the infrastructure devices 120 (e.g., the roadside units) 120 to improve behavioral policy selection by the autonomous agent 110.

Additionally, or alternatively, in various embodiments the infrastructure devices 120 are able to detect and track any type or kind of agents in an operating environment, such as with a video camera or radar. In such embodiments, an example video camera may function to provide detection of agents and semantic classification of the agent type and possible intent of an agent, such as a pedestrian that is about to cross a road, or a car that is about to make a left turn, a driver which is about to open a car door and exit their vehicle, a bicyclist operating in a bike lane, and/or the like.

Additionally, or alternatively, other infrastructure devices 120 may include traffic management devices or the like operating in the environment that may function to communicate with one or more of the roadside units and/or communicate directly with the autonomous agent 110 regarding data collected and/or sensed by the infrastructure device 120, regarding an operating state of the infrastructure device 120 (e.g., red or green traffic light), and the like. For example, in the case that the autonomous agent 110 is an autonomous vehicle, a traffic light may be an infrastructure device 120 in an environment surrounding the autonomous vehicle that may function to communicate directly to the autonomous vehicle or to a roadside unit that may be in operable communication with the autonomous vehicle. In this example, the traffic light may function to share and/or communicate operating state information, such as a light color that the traffic light is projecting, or other information, such as a timing of the light changes by the traffic light, and/or the like.

The communication interface 130 preferably enables the autonomous agent 110 to communicate and/or exchange data with systems, networks, and/or devices external to the autonomous agent 110. Preferably, the communication interface 130 enables one or more infrastructure devices 120 to communicate directly with the autonomous agent 110. The communication interface 130 preferably includes one or more of a cellular system (or any suitable long-range communication system), direct short-wave radio, or any other suitable short-range communication system. Additionally, or alternatively, the communication interface 130 may function to enable inter-vehicle communication between the autonomous agent 110 and other vehicles, including fully autonomous vehicles, semi-autonomous vehicles, and manual vehicles.

In some embodiments, in addition to a powertrain (or other movement-enabling mechanism), autonomous agent 110 may include a sensor suite (e.g., computer vision system, LiDAR, RADAR, wheel speed sensors, GPS, cameras, etc.) or onboard sensors that are in operable communication with the onboard computing system 115.

The sensor suite preferably includes sensors used to perform autonomous agent operations (such as autonomous driving) and data capture regarding the circumstances surrounding the autonomous agent 110 as well as data capture relating to operations of the autonomous agent 110 but may additionally or alternatively include sensors dedicated to detecting maintenance needs of the autonomous agent 110. For example, the sensor suite may include engine diagnostic sensors or an exterior pressure sensor strip. As another example, the sensor suite may include sensors dedicated to identifying maintenance needs related to cleanliness of autonomous agent interiors; for example, internal cameras, ammonia sensors, methane sensors, alcohol vapor sensors, etc.

In accordance with one or more embodiments, an autonomous operating system may generally include a controller 116 that controls autonomous operations and/or actions of the autonomous agent 110. That is, suitable software and/or hardware components of controller 116 (e.g., processor and computer-readable storage device) are utilized to generate control signals for controlling the autonomous agent 110 according to a routing goal of the autonomous agent 110 and selected behavioral policies of the autonomous agent.

Additionally, or alternatively, the autonomous agent 110 includes a sensor fusion system 117, a positioning system 118, and a guidance system 119. As can be appreciated, in various embodiments, the instructions may be organized into any number of systems (e.g., combined, further partitioned, etc.) as the disclosure is not limited to the present examples.

In various embodiments, the sensor fusion system 117 synthesizes and processes sensor data and predicts the presence, location, classification, and/or path of objects and features of the environment of the autonomous agent 110. In various embodiments, the sensor fusion system 117 may function to incorporate data from multiple sensors and/or data source, including but not limited to cameras, LiDARs, radars, infrastructure devices, remote data feeds (Internet-based data feeds), and/or any number of other types of sensors.

The positioning system 118 preferably processes sensor data along with other data to determine a position (e.g., a local position relative to a map, an exact position relative to lane of a road, vehicle heading, velocity, etc.) of the autonomous agent 110 relative to the environment. The guidance system 119 processes sensor data along with other data to determine a path for the vehicle 110 to follow.

In various embodiments, the controller 116 may function to implement machine learning techniques to assist the functionality of the controller 116, such as feature detection/classification, obstruction mitigation, route traversal, mapping, sensor integration, ground-truth determination, and the like.

The plurality of autonomous health monitors 310 preferably function to evaluate data streams from any data source associated with an operation and/or control of an autonomous agent 110 and output autonomous health intelligence data. In one embodiment, autonomous health intelligence data may relate to a judgement by each of the autonomous health monitors regarding a state of health of each of the devices and/or operations that produce the data streams. In one embodiment, each of the plurality of autonomous health monitors 310 may be configured to evaluate a different data stream originating from different data sources. For instance, a first data stream from a first device may be evaluated by a first autonomous health monitor and a second data stream from a second process or operation may be evaluated by a second autonomous health monitor and the like.

Each of the plurality of autonomous health monitors 310 may be in operable communication with the autonomous state machine 320. The autonomous state machine preferably functions to consume the autonomous health intelligence data as well as state data from any suitable source (e.g., from the plurality of autonomous control planning modules 410 or the like). In a preferred embodiment, the autonomous state machine 320 may be a device that is separate and distinct from the onboard computer 115 and may function to calculate an operating state or a level of operability (e.g., runlevel) of an autonomous agent based on inputs of health data. The computed operating state and/or the level of operability preferably includes a value that indicates an extent to which the capabilities and/or functionalities of autonomous agent are operable or not operable (e.g., runlevel 7=100% operability, runlevel 6=90% operability, and/or the like). While it may be generally described that a given level of operability may be associated with a percentage level of operability of an autonomous agent, it shall be noted that a level of operability shall not be restricted to such example, but may additionally or alternatively include embodiments in which a health system (e.g., health monitors) of the autonomous agent evaluates capabilities and/or operability of the autonomous agent's systems, and identifies a level of operability based on this evaluation.

In some embodiments, an ideal and/or optimal operating state of an autonomous agent 110 may include a computed operating state (or run level) that is not diminished or otherwise reduced. In such embodiments, the ideal and/or optimal operating state includes the highest operating state achievable according to a predetermined scale or spectrum of operating states for a given autonomous agent. Additionally, or alternatively, a computed operating state that is less than an ideal and/or an optimal operating state of an autonomous agent 110 may include a computed operated state that is diminished or otherwise reduced based on one or more defects, malfunctions, damage, and/or the like to the autonomous agent 110 that adversely affects an autonomous operation of the autonomous agent 110.

It shall be noted that while the autonomous state machine 320 may be implemented independently of an onboard computer 115 of an autonomous agent 110, the autonomous state machine 320 may be integrated with any suitable device and/or system of an autonomous agent 110 including the onboard computer 115.

The plurality of autonomous control planning modules 410 preferably function to generate a plurality of distinct autonomous control instructions for an autonomous agent 110. Accordingly, each of the plurality of autonomous control planning modules 410 may function to output different autonomous control instructions or plans that correspond to a different level of operability of an autonomous agent.

Additionally, each of the plurality of autonomous control planning modules 410 may be configured to continuously collect data streams from a plurality of data sources (e.g., onboard and offboard data sources) and run in parallel and asynchronously to continuously simulate one or more trajectory outcomes for an autonomous agent 110 and/or one or more agents in an operating environment of the autonomous agent 110 and correspondingly, generate autonomous control instructions based on a simulation having a highest probability of occurring, as described in U.S. Provisional Application No. 62/701,014, which is incorporated by this reference in its entirety. In a preferred embodiment, each of the autonomous control planning modules 410 may operate to continuously (at all times) output autonomous control instructions to the arbiter of autonomous control instructions or the like. Additionally, or alternatively, the autonomous control planning modules may operate to periodically output autonomous control instructions, which may be based on computed or aggregated health intelligence data.

The arbiter of autonomous control instructions 420 preferably functions to collect, as a first input, the plurality of autonomous control instructions from the plurality of autonomous planning modules 410 as well as receive, as a second input, data relating to an identified level of operability from the autonomous state machine 310. Based on the input of the level of operability of the autonomous agent 110, the arbiter 420 may function to selectively enable only a subset of the plurality of autonomous control instructions to pass to lower level devices and/or operating (e.g., driving) components of an autonomous agent 110. For instance, if an input of runlevel_3 (out of seven possible runlevels) is received from the autonomous state machine, the arbiter may function to selectively allow only autonomous control instructions (e.g., autonomous control instructions_3 from planning module_3) mapped to runlevel_3 to pass as command instructions for operating one or more devices of the autonomous agent. The subset of the plurality of autonomous control instructions, when executed by the lower level devices and/or operating components of the autonomous agent 110 preferably function to instruct and/or control an operation of the lower level devices and/or operating components.

Additionally, or alternatively, the arbiter 420 may be configured with selection circuitry or the like that enables the arbiter 420 to selectively pass valid autonomous control instructions for controlling the autonomous agent 110. In one embodiment, the selection circuitry includes a switch that operably switches between autonomous control instructions based on an input of the level of operability. In another embodiment, the selection circuitry includes a plurality of filters that may be selectively activated for filtering (out) autonomous control instructions and allowing only select (or unfiltered) autonomous control instructions to pass based on an input of the level of operability. In yet a further embodiment, the arbiter 420 may be configured with selection circuitry that blocks autonomous control instructions based on a computed operating state of the autonomous agent.

3. Method for Safely Controlling an Autonomous Agent

Figure 2:
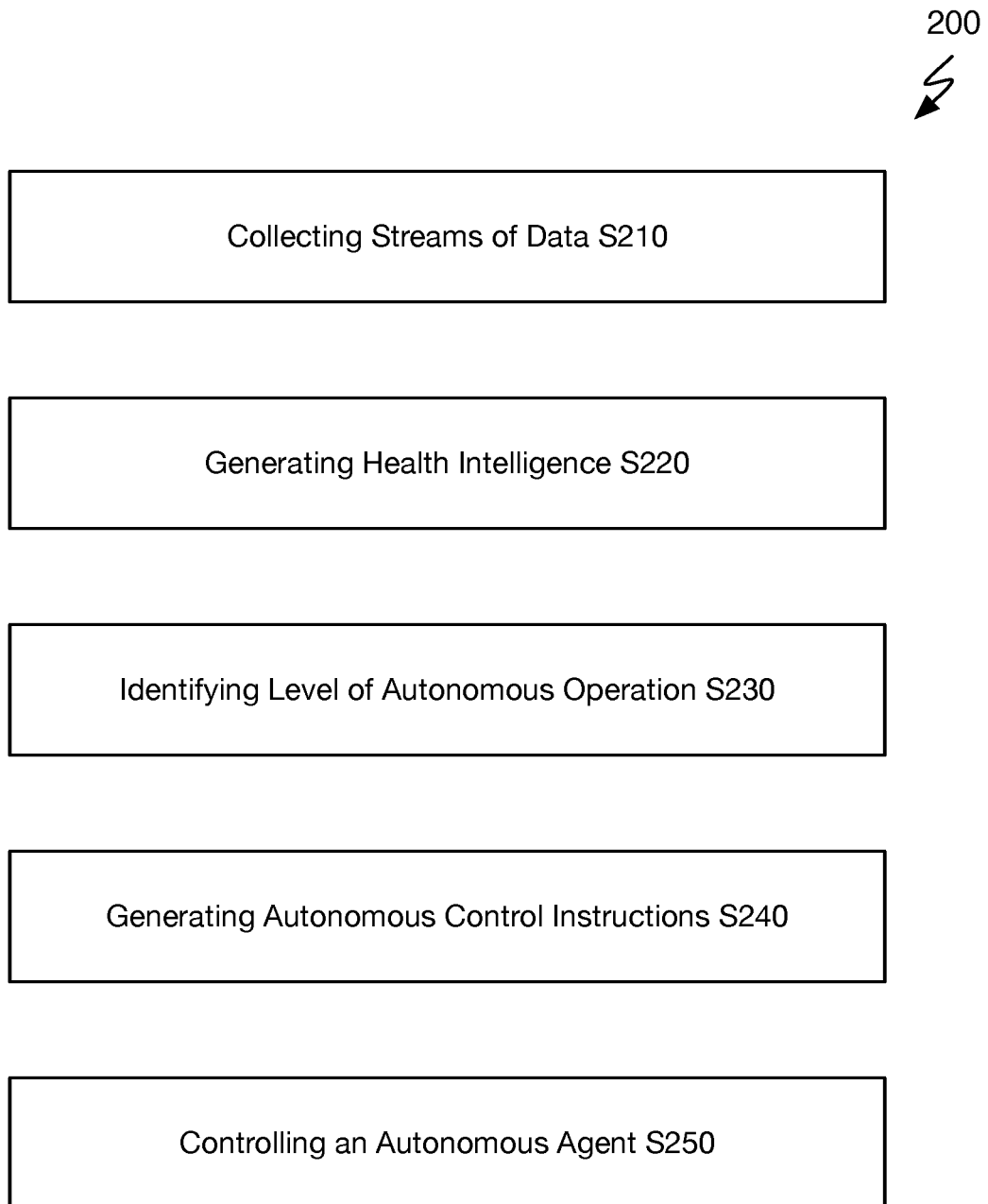
FIG. 2 illustrates an example method in accordance with one or more embodiments of the present application.

As shown in FIG. 2, a method 200 for safely controlling an autonomous agent includes collecting data from one or more data sources S210, generating health intelligence data S220, identifying a level of operability (e.g., a runlevel) S230, generating autonomous control instructions S240, and selectively controlling an autonomous agent S250.

Data Aggregation

S210, which includes collecting data from one or more data sources, functions to collect streams of data from one or more data sources associated with an autonomous agent. Preferably, S210 may function to collect the streams of data at an autonomous agent, such as an autonomous vehicle or the like. In a preferred embodiment, the one or more data sources may include devices and/or system of an autonomous agent, sensors mounted (e.g., onboard sensors) on the autonomous agent, processes performed by or involving the autonomous agent, and infrastructure devices in an environmental proximity of the autonomous agent. It shall be noted that while the one or more data sources preferably include devices and/or systems of the autonomous agent, onboard sensors, and infrastructure devices (e.g., receiving health statuses from offboard devices, such as roadside units), the one or more data sources may additionally or alternatively include one or more remote data feeds (e.g., weather feed, traffic feed, etc.), a remote autonomous agent platform (e.g., remote servers, cloud servers, etc. for remotely managing and/or operating an autonomous agent), other autonomous agents, and any other suitable data source accessible to the autonomous agent.

In one preferred embodiment, S210 may function to collect streams of data from one or more onboard devices and/or onboard processes associated with an autonomous agent. For example, one or more onboard devices may include one or more onboard sensor devices that may function to capture and/or sense data regarding an environment or circumstances surrounding an autonomous agent. Additionally, or alternatively, the one or more onboard devices may function to capture and/or sense data relating to an operation of one or more low-level devices (e.g., actuators, actuated devices, etc.), operating systems (e.g., onboard computing system, controller, sensor fusion system, positioning system, guidance system, communication interface, and the like), etc.

In one preferred embodiment, S210 may function to collect streams of data from infrastructure devices. In such preferred embodiment, S210 functions to collect the streams of data during an operation of the autonomous agent but may also function to collect the streams of data during period in which the autonomous agent is not in an active state (e.g., parked or the like). The infrastructure devices preferably include one or more sensor devices that are intelligently arranged and/or positioned within an environment. For instance, the one or more sensor devices may be arranged to collect data that may be assistive for determining and/or generating driving/operating (control) instructions for an autonomous agent and also, for decisioning by an autonomous agent when presented with multiple driving and/or operating instructions which instructions to execute and which instructions to disregard. Thus, the one or more infrastructure sensors may function to collect data in a driving environment, which may include road data, sidewalk data, positions of static and/or dynamic object data (e.g., agent data), traffic data, and the like along a given route plan or a possible route plan of a given autonomous agent.

In some embodiments, the infrastructure devices may include one or more sensor devices that are fixedly attached or positioned within an (driving) environment, such that a fixed (or substantially) coordinate location of the one or more sensor devices may be known. Accordingly, such fixedly arranged infrastructure devices may have a fixed field-of-detection. For instance, a camera fixed in a driving environment may have a fixed field-of-view. In some embodiments, the infrastructure devices may include one or more sensors devices that are movably positioned within an environment, such that a coordinate location of the one or more sensor devices varies. In such embodiments, the infrastructure devices may have a variable field-of-detection and may be capable of sensing data along multiple trajectories within an environment.

In a first implementation, S210 may function to automatically collect streams of data from one or more infrastructure devices that are in communication proximity of the autonomous agent. In some embodiments, the infrastructure devices may be configured to communicate with an autonomous agent using short-ranged communication schemes or systems. In such embodiments, once the autonomous agent has entered a communication range or proximity of a given infrastructure device, the autonomous agent may function to automatically detect signals from the infrastructure device and automatically collect data originating from the infrastructure device.

In a second implementation, S210 may function to automatically collect streams of data from one or more infrastructure devices that are a predetermined distance from an operating autonomous agent. That is, in some embodiments, an operating environment of an autonomous agent may include a plurality of infrastructure devices, however, the autonomous agent may be configured to automatically collect data from only a subset of the plurality of infrastructure device within the predetermined distance of the autonomous agent and possibly, ignore data incoming from other infrastructure devices outside of the predetermined distance of the autonomous agent. In this way, the autonomous agent may function to collect data having a more immediate or higher relative importance for pending and/or immediate operating decisions.

In a variant of the second implementation, S210 may function to automatically collect streams of data from one or more infrastructure devices that are a predetermined distance of the autonomous agent and weigh or consider data collected from the one or more infrastructure devices within an active trajectory or travel path of the autonomous agent differently than data from infrastructure devices that are not or no longer within a trajectory or travel path of the autonomous agent. That is, in some embodiments, S210 may function to weigh data from infrastructure devices that are substantially coincident with a position of the autonomous agent and ahead of a travel path of the autonomous agent with additional weight than a weight afforded to data from infrastructure devices behind or that has been passed by the autonomous agent along its travel path.

In some embodiments, the data collected from the one or more infrastructure devices may include compressed and/or semantically dense data regarding one or more features of an environment. In some embodiments, the field-of-detection of given infrastructure device comprises a geometrically defined region and within the geometrically defined region, the infrastructure device may be configured to sense or collect a semantic abstraction (e.g., a general shape or size, positions, velocity (moving or not moving) of the features, objects, and/or agents within the geometrically defined region.

Additionally, or alternatively, in some embodiments, the one or more infrastructure devices may be configured to sense or detect data within the geometrically defined region and derive and/or compute a state data about the circumstances within the geometrically defined shape. For instance, if the geometrically-defined shape or sensing region is a square that includes a sidewalk or similar pedestrian path, a first infrastructure sensor device may function to identify whether there are motionless agents (objects or persons that are not moving) and/or moving agents (objects or persons that are moving) on the sidewalk and provide as state data to the autonomous agent an indication confirming motionless agents or moving agents positioned on the sidewalk. In one or more instances in the present application, motionless agents may sometimes be referred to herein as static agents thereby identifying an agent (object or person) that is not moving within a sensed region or scene. Also, in one or more instances in the present application, moving agents may sometimes be referred to herein as dynamic agents thereby identifying an agent that is moving within a sensed region or scene.

In some cases, if there are no agents positioned within the geometrically-defined sensing region, the state data may be an indication of no agents (e.g., "Clear"). Thus, in such embodiments, rather than sending a full representation of a scene within the geometrically-defined shape or sensing region, the infrastructure device may provide semantically dense state data to an autonomous agent. As a few examples of state data, the infrastructure sensing devices may indicate Agent or No Agent, Static Agent or Dynamic Agent, Clear or Not Clear, Busy (Active) or Not Busy (Not Active), and/or any suitable simplified and/or derivative information about circumstances within a sensing region of an infrastructure device that may be provided to an autonomous agent.

Health Monitors

S220, which includes generating health intelligence data, functions to evaluate data streams from one or more data sources associated with an autonomous agent and additionally, functions to generate autonomous agent health intelligence indicative of a quality of operation of one or more processes, operations, and/or component devices (e.g., onboard sensors, offboard sensors, onboard modules, and the like) associated with the autonomous agent.

In some embodiments, S220 may function to implement one or more health monitors to evaluate the data streams and further, detect errors, deficiencies, degradation, failings, and/or the like in the data source based the evaluation of the data streams. S220 preferably includes evaluating the data streams against autonomous operation health standards (e.g., comparing streams of data to autonomous operation health standards), but may additionally, or alternatively, include analyzing the streams of data in any suitable manner to determine the health of data sources including one or more autonomous operations, processes, modules, devices (components), and/or the like (e.g., using heuristics). Accordingly, the generated health data or generated health intelligence may include metadata of the data streams that may be used as input and/or decisioning data by one or more downstream modules or devices (e.g., an autonomous state machine) associated with the autonomous agent. Explicitly, S220 may function to use one or more health monitors associated with the autonomous agent to perform an introspection of onboard data sources, per se, and/or data streams originating from onboard data sources of the autonomous agent and derive quality metrics (health metrics or health metadata values) for each of the onboard data sources and/or onboard data streams based on reprocessing directly on data.

In a preferred embodiment, S220 may function to implement multiple health monitoring devices and/or modules (health monitors). In such preferred embodiment, each of the multiple health monitors may be configured differently and for the purposes of evaluating different streams of data and generating health data for a specific type or kind of stream of data. In one non-limiting example, a first stream of data may originate from an onboard computing process, a second stream of data may originate from an offboard sensor, a third stream of data may originate from an onboard sensor and each of the respective first, second, and third streams of data may pass as input into a first, a second, and a third health monitor, respectively. In such example, streams of data from a first data source may be mapped to a first health monitor and streams of data from a second data source may be mapped to a second health monitor and the like. In some embodiments, multiple streams of data from disparate data sources may be mapped to a single health monitoring module. In some embodiments, a single stream of data may be mapped to multiple, distinct health monitors.

Additionally, or alternatively, the streams of data from many or all data sources may be fused or combined into a composite stream of data and provided as input into each of a plurality of disparate health monitors. In one embodiment, each of the plurality of disparate health monitors may selectively evaluate and/or process data from the composite data stream according to a preset configuration of the respective health monitor. For example, a first health monitor may function to evaluate data streams from an offboard video camera and a second health monitor may function to evaluate data streams from onboard LiDAR. In such example, a composite data stream may include a combination of data streams from multiple data sources include offboard video and onboard LiDAR and when the composite data stream is received as input into each of the plurality of disparate health monitors, the first health monitor may selectively extract or isolate data or the stream of data relating to the offboard video camera and the second health monitor may selectively extract or isolate data or the stream of data relating to the onboard LiDAR.

As mentioned above, each of the plurality of health monitors may function to generate an output relating to the evaluated streams of data. In a preferred embodiment, an output of each of the plurality of health monitors comprises metadata that describes a health or quality of the evaluated data, per se, and/or the health or the quality of a module, process, device, or generally data source that generates the stream of data.

In some embodiments, an output of each health monitor may be a binary health indication of the evaluated stream of data. For instance, a health monitor may output an indication of "Healthy" or "Unhealthy", "Pass" or "Fail", "Good" or "Bad", "Known" or "Unknown" and/or the like. Additionally, or alternatively, an output of each health monitor may be selected from a spectrum or continuum of health scores, health grades, or generally health values. Accordingly, a health monitor may be able to output one of a plurality of health values (e.g., three or more) selected from a reference health spectrum or health continuum for a given stream of data. For instance, a health continuum may include the selectable values of "low", "medium", and "high" for a given stream of data that relates to a speed or rate of communication between onboard and offboard devices associated with an autonomous agent. In such instance, a health monitor may function to output one of "low", "medium", and "high" based on its evaluation of the rate of communication between the onboard device and the offboard device.

Additionally, or alternatively, S220 may function to map each of the plurality of health monitors to expected health values (e.g., expected statistics, expected configuration, etc.) or expected health datasets and/or configure each of the plurality of health monitors with expected health values or expected health datasets (expected health standards). Preferably, for each health monitor, the expected health values or the expect health datasets may specify minimum/maximum criteria that data sources, data processes, data streams, or the like should (or must) meet for particular runlevels or for executing behavioral policies or the like. For instance, the expected health values may include minimum, maximum, and/or optimal metrics and/or operational ranges for varying components and/or processes associated with an autonomous agent. Accordingly, expected health values can include expected health data (e.g., desirable data source health data or data stream health data that reduces the probability of runlevel degradation or the like), unexpected health data (e.g., features or attributes of the data source or data stream that is not expected, etc.), pre-established or predetermined health standards (e.g., health standards selected by a designer or operator of an autonomous agent), and/or any other suitable health data.

In some embodiment, the expected health values associated with a health monitor may be predetermined and/or set in advance. In such embodiment, the expected health values may be based on a historical running averages associated with a normal or standard operation of a data source and thus, some expected health values may be statistically defined (e.g., a reference expected rate or the like). In some embodiments, the expect health values may be a non-statistical value but rather, an expected state of operation (e.g., On/Off, Fast/Slow, Up/Down, etc.). In some embodiments, the expected health values reference by a health monitor may be dynamic. In such embodiments, the expected health values may be dynamically updated may according to one or more environmental circumstances associated with an autonomous agent.

Additionally, or alternatively, each health monitor implemented in S220 may be configured to reference or evaluate a data stream against one or more predetermined failure modes for a given data source. The failure mode may identify a circumstance in which it is known that a data source may be or is likely in a failing state. Accordingly, in such embodiments, if attributes of the data stream match attributes of a failure mode, a health monitor may function to output health intelligence data indicating that a data source associated with the data stream is failing or in a failure mode (a failing state).

State Machine

S230, which includes identifying a level of operability, functions to determine a level of operability of an autonomous agent based at least on autonomous operation health intelligence data (derived in S220) associated with the autonomous agent. A level of operability preferably relates to one of a plurality of differentiated levels of autonomous operation identified within an autonomous operation gradient (sometimes referred to herein as autonomous operation cascade). The autonomous operation gradient preferably includes a range of levels of autonomous operation of an autonomous agent from fully autonomous operation at a top of the gradient or cascade to limited or no autonomous operation at a bottom of the gradient or cascade. A plurality of diminished or degraded levels of autonomous operation of an autonomous agent may be arranged between a level of fully autonomous operation to a level of limited or no autonomous operation. In a preferred embodiment, the plurality of diminished or degraded levels are degraded in autonomous operation capabilities starting from the fully autonomous operation level and gradually to the level of limited or no autonomous operation.

Additionally, or alternatively, in some implementations, a level of operability relates to one of a plurality of differentiated or distinct levels of autonomous (semi-autonomous, manual, etc.) operation of a multi-dimensional matrix. In such implementations, the multi-dimensional matrix may include a mapping between identified or computed capabilities (based on health intelligence data) and the plurality of differentiated or distinct levels of autonomous operation. Accordingly, in some embodiments, multiple, distinct combinations of computed capabilities of the autonomous agent may be mapped to one or more of the plurality of differentiated or distinct levels of autonomous operation such that a distinct combination of capabilities of an autonomous agent may achieve more than one runlevel or more than one distinct level of autonomous operation. Conversely, within a variation of the multi-dimensional matrix, each of the plurality of differentiated or distinct levels of autonomous operation may be mapped to one or more distinct combinations of computed capabilities.

In a fully autonomous operation mode or level, an autonomous agent may have complete operational independence and full self-governing authority without any intervening secondary (or overriding) control/governing source (e.g., 100% autonomous) from an external source and/or a manual governance source. That is, the fully autonomous operation mode may be a highest level of independence that may be afforded an autonomous agent without human intervention and/or without the intervention of an operational governing source other than a primary onboard computer and/or primary onboard controller of an autonomous agent (e.g., an autonomous decisioning source). In a limited or no autonomous operation mode or level, capabilities and/or functionality of an autonomous agent to self-govern with respect to one or more specific self-determined operations may be severely curtailed (e.g., 0% to less than 50% autonomous (percentage autonomy capability)) and in some embodiments, autonomous functionality is completely eliminated from the autonomous agent. In a limited autonomous operation mode or level, the autonomous agent may function to self-determine and self-govern with respect to various driving operations or the like and in such limited autonomous operation mode, a non-computer operator or human operator may function to intervene or perform one or more driving operations that are restricted from the autonomous capabilities of the autonomous agent. For instance, in a limited autonomous state, the autonomous agent may be capable of self-governing its driving operations (e.g., vehicle acceleration, braking, steering, etc.) along a given path (e.g., a first street), but may be restricted from performing turning operations or the like onto another path (e.g., a second street) and the turning operation, in such instance, may be performed by a human operation handling a steering interface or mechanism of the autonomous agent.

Preferably, each of the autonomous operation modes or levels within an autonomous operation gradient is mapped to a predetermined set of minimum capabilities and/or functionalities of an autonomous agent. The predetermined set of minimum capabilities and/or functionalities mapped to each mode or level within the autonomous operation gradient indicates the minimally required capabilities and/or functionality of an autonomous agent required to satisfy a corresponding mode or level of the autonomous operation gradient. For example, an autonomous operation gradient may include seven different levels of autonomous operation and each of the seven different levels of autonomous operation may be mapped to a different reference dataset comprising a predetermined set of minimum capabilities and/or functionalities.

In one preferred embodiment, S230 may function to evaluate the autonomous health intelligence data against one or more of levels (or modes) within the autonomous operation gradient and identify a highest level or mode of autonomous operation that is satisfied by the autonomous health intelligence data. For instance, an autonomous state machine may receive autonomous health intelligence data and evaluate (compare) the autonomous health intelligence data against autonomous operation requirements of each of a plurality of levels of autonomous operation within an autonomous operation gradient. In such example, the autonomous state machine may determine that the received autonomous health intelligence data satisfies the minimum autonomous capabilities and/or functionality requirements of levels one through five of a total of seven levels and thus, higher levels six and seven may not have been satisfied. Accordingly, in this example, the autonomous state machine may function to select the autonomous operation level having a highest level of operability for a given autonomous agent, which may be autonomous operation level 5 bestowing a somewhat degraded level of operability (since level five is lower than levels six and seven). In this example, it is assumed that the highest value level (i.e., level seven) within the gradient indicate the highest levels of autonomous operability and/or functionality (e.g., a most optimal form of autonomous operation) to an autonomous agent while the lower levels beginning at level six heading towards level one gradually indicate lower levels or diminished levels of autonomous operability and/or functionality of the autonomous agent.

Additionally, or alternatively, the autonomous state machine may function to compute or output a plurality of allowed (or permissible) operating states of the autonomous agent based on input of the plurality of distinct health monitors. That is, in some embodiments, the autonomous state machine may function to output more than one runlevel or level of operability for a given autonomous agent. For instance, the autonomous state machine may function to identify a highest level of operability (i.e., runlevel) based on health intelligence data and output the identified highest level of operability together with one or more lower levels of operability that fall under or that are lesser than the identified highest level of operability. In this way, the autonomous agent may operate to select from a computed set of levels of operability.

Additionally, or alternatively, once a level of operability is identified or selected by the autonomous state machine or the like, S230 may function to output the level of operability to an arbiter of autonomous control instructions. Preferably, S230 functions to output the level of operability to the arbiter of autonomous control instructions as the levels are generated; however, S230 may function to only output the level of operability to the arbiter if a change in the level of operability has occurred. In such instances, when levels of autonomous operation are not provided to the arbiter, the arbiter may function to assume that the most recently received level of operability is valid.

Planning Modules

S240, which includes generating and/or computing autonomous control instructions, functions to implement a plurality of autonomous control planning modules (planning modules) to generate a plurality of autonomous control instructions. Preferably, each of the plurality of autonomous control planning modules may be mapped to one of the plurality of differentiated levels of autonomous operation (described in S230). Accordingly, each planning module may be configured to generate autonomous control instructions that is suitable to a determined capability (level of operability) of an autonomous agent. For instance, a first planning module_1 may correspond to or generate instructions for a first level of operability, a planning module_2 may correspond to or generate instructions for a second level of operability, and the like.

The plurality of autonomous control planning modules are preferably implemented independently and operated in parallel, such that each of the plurality of autonomous control planning modules functions to generate autonomous control instructions continuously or substantially continuously as input data is received at the respective planning module.

Further, the autonomous control instructions output by each planning module preferably includes command signals and/or control instructions for governing an operation and/or functionality of various low-level devices (e.g., actuators associated with brakes, an accelerator, steering mechanisms, etc.) of an autonomous agent.

S240 preferably functions to receive, at each of the plurality of autonomous control planning modules, input of data streams from one or more data sources associated with an autonomous agent and use the data streams to generate disparate autonomous control instructions. The data streams may be received directly from the one or more data sources and/or received from one or more data processing sources (or secondary sources), such as a data fusion module or the like. Additionally, or alternatively, the planning modules may function to receive any suitable type or kind of data, including, but not limited to, raw input data (from onboard data sources and offboard data sources), pre-stored data (e.g., global map), and the like. Additionally, or alternatively, a type or kind of data used as input for generating autonomous control instructions may be dependent on a determined a level of operability (derived in S230). For instance, in the case that a degraded level of operability (e.g., level 3 out of 7 levels) is determined indicating that one or more sensor capabilities may be malfunctioning (e.g., LiDAR is inoperable) but indicates that only a subset of the sensors (e.g., sonar or the like) is operable, the planning module corresponding to the identified level of operability may function to ignore data streams or data from the malfunctioning sensor(s) and only accept data streams from the one or more sensors (e.g., accept data streams from sonar and reject or ignore data streams from LiDAR) determined as having normally functioning capabilities under the identified level of operability. Accordingly, based on the identified level of operability, an autonomous control planning module may selectively accept and reject data streams from various data sources to prevent from using data streams from data sources that may be tainted or failing as input for generating autonomous control instructions and only use, as input, data streams from data sources that may be determined as being reliable according to the identified level of operability.

Arbiter

S250, which includes selectively controlling an autonomous agent, functions to select one of the plurality of autonomous control instructions according to the identified level of operability. In a preferred embodiment, S250 may function to implement an arbiter of autonomous control instructions that receives multiple inputs (in parallel and/or continuously) from the plurality of autonomous control planning modules as well as from the autonomous state machine. In such preferred embodiment, the arbiter of autonomous control instructions may function to decide which of the plurality of autonomous control instructions from each of the plurality of autonomous control planning modules to allow as command instructions for controlling the autonomous agent based on the identified level of operability received from the autonomous state machine.

At the arbiter of autonomous control instructions, S250 may function to use an input of the level of operability to selectively operating a command filter and/or command switch. Accordingly, an input of the level of operability (e.g., runlevel) to set or configure a command filter and/or set or configure a command switch.

In one implementation, the arbiter of autonomous control instructions, may function to operate or implement a command filter selected or activated from a plurality of different command filters. Each of the plurality of different command filters may be configured to pass command instructions or autonomous operation instructions from one of the plurality of autonomous control planning modules. Thus, in such implementation, the received level of operability may function as activation input that selectively activates only one of the plurality of different command filters. For instance, the arbiter of autonomous control instructions may be able to operate seven different command filters with each command filter being able to pass through commands of one of seven planning modules. In this instance, if a level of operability of level three (out of seven different levels) is received at the arbiter, this may function to activate command filter_3 which only allows autonomous control instructions from planning module_3 to pass through the arbiter to control one or more lower level devices and/or operations of an autonomous agent. The remaining six autonomous control instructions from the remaining six planning modules may be ignored, blocked, discarded, stored, and/or the like.

In a second implementation, the arbiter of autonomous control instructions, may function to operate or implement a command switch that functions to switch between the plurality of autonomous control instructions received from each of the plurality of autonomous control planning modules based on a received level of operability. That is, the arbiter of autonomous controls instructions may function to receive all autonomous control instructions from the plurality of autonomous control planning modules and may function to operate the command switch to selectively enable command instructions (e.g., command signals, command data packets, and/or the like) to pass through the arbiter and the remaining autonomous control instructions for the other planning modules may be ignored, blocked, discarded, stored, and/or the like.

While a selective transmission of the autonomous control instructions is preferably performed by an arbiter of autonomous control instructions, it shall be noted that the transmission of autonomous control instructions to lower level devices of an autonomous agent may be performed by any suitable circuit and/or module of an autonomous agent that is capable of switching between planning module instructions, filtering planning module instructions, and/or the like.

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for intelligently implementing an autonomous agent, the system comprising:
a plurality of infrastructure sensing devices;
an autonomous agent comprising:
a communication interface that enables the autonomous agent to communicate with at least one of the plurality of infrastructure sensing devices;
a plurality of distinct health monitors, wherein each of the plurality of distinct health monitors monitor one or more distinct operational aspects of the autonomous agent;
an autonomous state machine that computes a plurality of allowed operating states of the autonomous agent based on inputs from one or more of the plurality of distinct health monitors;
a plurality of distinct autonomous controllers that generate a plurality of distinct autonomous control instructions; and
an arbiter of autonomous control instructions that:
collects, as a first input, the plurality of autonomous control instructions generated by each of the plurality of distinct autonomous controllers;
collects, as a second input, data relating to the plurality of allowed operating states of the autonomous agent;
switches between the plurality of distinct autonomous control instructions based on the plurality of allowed operating states of the autonomous agent; and
selectively enables only a subset of the plurality of distinct autonomous control instructions to pass to one or more driving components of the autonomous agent thereby controlling operations of the one or more driving components.

2. The system according to claim 1, wherein:
each of the plurality of infrastructure sensing devices generates subjective health status data based on introspective evaluations of one or more operations or one or more systems of the respective infrastructure sensing device of the plurality of infrastructure devices.

3. The system according to claim 1, wherein:
the plurality of allowed operating states of the autonomous agent includes a computed value that indicates an extent to which capabilities of the autonomous agent are operable or not operable.

4. The system according to claim 1, wherein
each of the plurality of distinct autonomous controllers:
collects data streams of observation data from a plurality of distinct data sources;
operates asynchronously to simulate one or more trajectory outcomes for the autonomous agent based on the observation data; and
generates autonomous control instructions based on a simulation having a highest probability of occurring.

5. The system according to claim 1, wherein
the arbiter of autonomous control instructions blocks a portion of the plurality of distinct autonomous control instructions from passing to the one or more driving components of the autonomous agent based on the plurality of allowed operating states of the autonomous agent.

6. The system according to claim 1, wherein
the arbiter of autonomous control instructions includes selection circuitry comprising a plurality of instruction filters, wherein based on the plurality of allowed operating states of the autonomous agent, a subset of the plurality of instruction filters is selectively activated for filtering out portions of the plurality of autonomous control instructions.

7. A method for intelligently implementing an autonomous agent, the method comprising:
collecting streams of data from one or more data sources associated with an autonomous agent;

generating, by a plurality of health monitors, autonomous health intelligence data indicating a quality of operation of one or more operational aspects of the autonomous agent;

identifying a level of operability of the autonomous agent based on the autonomous health intelligence data, wherein the level of operability relates to one of a plurality of differentiated levels of autonomous operation identified within an autonomous operation gradient;

computing by a plurality of autonomous control planning modules a plurality of distinct autonomous control instructions; and controlling the autonomous agent by selectively passing a subset of the plurality of distinct autonomous control instructions based on the identified level of operability.

8. The method according to claim 7, wherein
the one or more data sources include one or more onboard sensors of the autonomous agent and one or more offboard infrastructure devices arranged along a route and in a proximity of an area of operation of the autonomous agent.

9. The method according to claim 7, wherein
generating the health intelligence data includes evaluating the streams of data against autonomous operating health standards.

10. The method according to claim 7, wherein
generating the health intelligence data includes evaluating the streams of data against one or more failure modes, wherein the one or more failure modes identify circumstances in which it is likely that a data source associated with the autonomous agent is in a failing state.

11. The method according to claim 10, wherein
if attributes of the streams of data match attributes of any of the one or more failure modes, one or more of the plurality of health monitors outputs health intelligence data indicating that a data source is likely in a failing state.

12. The method according to claim 7, wherein
each of the plurality of health monitors is mapped to expected health values, wherein the expected health values specify criteria that the one or more data sources should satisfy for a given level of operability of the autonomous agent.

13. The method according to claim 7, wherein
the autonomous operation gradient includes a range of distinct levels of autonomous operation of an autonomous agent ranging from fully autonomous operation at one side of the autonomous operation gradient to limited or no autonomous operation at an opposite of the autonomous operation gradient.

14. The method according to claim 7, wherein
within the autonomous operation gradient, a plurality of diminished or degraded levels of autonomous operation of an autonomous agent may be arranged between a level of fully autonomous operation and a level of limited or no autonomous operation.

15. The method according to claim 7, wherein
each of the plurality of differentiated levels of autonomous operation is mapped to a predetermined set of minimum capabilities of an autonomous agent, wherein the predetermined set of minimum capabilities indicates the minimally required capabilities for maintaining an associated level of autonomous operation.

16. The method according to claim 7, wherein
identifying the level of operability of the autonomous agent includes:
evaluating the autonomous health intelligence data against one or more of levels within the autonomous operation gradient; and
identifying a highest level of autonomous operation within the autonomous operation gradient that is satisfied by the autonomous health intelligence data.

17. The method according to claim 7, wherein
each of the plurality of autonomous control planning modules is mapped to a distinct one of the plurality of differentiated levels of autonomous operation.

18. The method according to claim 7, wherein
controlling the autonomous agent includes deciding which of the plurality of distinct autonomous control instructions from each of the plurality of autonomous control planning modules to allow as command instructions for controlling driving components or driving processes of the autonomous agent based on the identified level of operability.

19. A system for intelligently implementing an autonomous agent, the system comprising:
a plurality of infrastructure sensing devices;
an autonomous agent comprising:
a communication interface that enables the autonomous agent to communicate with at least one of the plurality of infrastructure sensing devices;
a plurality of distinct health monitors, wherein each of the plurality of distinct health monitors monitor one or more distinct operational aspects of the autonomous agent;
an autonomous state machine that computes a plurality of allowed operating states of the autonomous agent based on inputs from one or more of the plurality of distinct health monitors;
a plurality of distinct autonomous controllers that generate a plurality of distinct autonomous control instructions, wherein each of the plurality of distinct autonomous controllers:
collects data streams of observation data from a plurality of distinct data sources;
operates asynchronously to simulate one or more trajectory outcomes for the autonomous agent based on the observation data; and
generates autonomous control instructions based on a simulation having a highest probability of occurring; and
an arbiter of autonomous control instructions that:
collects, as a first input, the plurality of autonomous control instructions generated by each of the plurality of distinct autonomous controllers;
collects, as a second input, data relating to the plurality of allowed operating states of the autonomous agent; and
selectively enables only a subset of the plurality of distinct autonomous control instructions to pass to one or more driving components of the autonomous agent thereby controlling operations of the one or more driving components.

* * * * *